United States Patent [19]

Cole

[11] 4,258,978
[45] Mar. 31, 1981

[54] IMAGE REVERSING ARRAY UTILIZING GRADIENT REFRACTIVE INDEX ELEMENTS

[75] Inventor: Henry B. Cole, East Woodstock, Conn.

[73] Assignee: American Optical Corporation, Southbridge, Mass.

[21] Appl. No.: 966,675

[22] Filed: Dec. 5, 1978

[51] Int. Cl.³ .......................... G02B 5/17; G03B 27/00
[52] U.S. Cl. .............................. 350/96.25; 350/96.31; 355/1
[58] Field of Search ............... 350/96.24, 96.25, 96.26, 350/96.27, 96.28, 96.30, 96.31, 175 GN; 355/1, 8

[56] References Cited

U.S. PATENT DOCUMENTS

| | | | |
|---|---|---|---|
| 2,961,758 | 11/1960 | Slayter | 350/96.24 X |
| 2,992,517 | 7/1961 | Hicks | 49/79 |
| 3,037,241 | 6/1962 | Bazinet et al. | 65/3 A X |
| 3,060,805 | 10/1962 | Brumley | 355/1 X |
| 3,194,142 | 7/1965 | Black | 355/1 |
| 3,398,669 | 8/1968 | Hicks | 355/1 |
| 3,625,686 | 12/1971 | Kitano | 350/96.27 X |
| 3,658,407 | 4/1972 | Kitano et al. | 350/96.25 |
| 3,721,828 | 3/1973 | Parks | 350/175 GN X |
| 3,801,181 | 4/1974 | Kitano et al. | 350/96.31 |
| 3,963,468 | 6/1976 | Jaeger et al. | 65/3 A |
| 3,977,777 | 8/1976 | Tanaka et al. | 355/1 |
| 3,977,855 | 8/1976 | Cole | 350/96.25 X |
| 4,053,205 | 10/1977 | Miller | 350/96.31 |
| 4,057,320 | 11/1977 | Marcatili | 350/96.31 |
| 4,061,484 | 12/1977 | Aulich et al. | 65/2 |
| 4,106,847 | 8/1978 | Arnaud | 350/96.31 |
| 4,154,500 | 5/1979 | Funato et al. | 350/96.25 |

OTHER PUBLICATIONS

Arnaud, "Pulse Spreading in Multimode, Planar, Optical Fibers", *Bell Syst. Tech. Journal*, vol. 53, No. 8, Oct. 1974, pp. 1599–1618.

*Primary Examiner*—John K. Corbin
*Assistant Examiner*—John D. Lee
*Attorney, Agent, or Firm*—Jeremiah J. Duggan; Alan H. Spencer

[57] ABSTRACT

An array of optical elements having imaging properties in one meridian and light-containment properties in another meridian for imaging a slit aperture in such a way that inversion of the image occurs across the width of the slit but not along the length of the slit. This one-way image reversal may be used to improve efficiency in photocopying.

10 Claims, 7 Drawing Figures

IMAGE REVERSING ARRAY UTILIZING GRADIENT REFRACTIVE INDEX ELEMENTS

BACKGROUND OF THE INVENTION

1. Field of the Invention

Optical image transmitting devices with particular reference to an array of optical elements for effecting image inversion.

2. Discussion of the Prior Art

A need for this invention arises from the fact that the simplest optical systems for photocopying tend to produce reverse, mirror-image, copies rather than true copies of an original (an example is contact printing). There are several conventional methods for correcting this image reversal, all with some disadvantages and limitations. One method, the use of a mirror, is appropriate only when a lens or other imaging element provides sufficient space in the optical path. Another method is the use of two copying steps with temporary storage of the reversed image. Also, in some applications, it is possible to project the light through the transparent or translucent base material of the original or the copy, thus achieving the required reversal. Still another method of correcting mirror imaging is "reversed motion copying", e.g. as in U.S. Pat. No. 3,398,669. In this method, the original is scanned by a narrow aperture and copied in a reversed sequence. The limitation on this method is that the slit aperture must normally be very narrow in order to achieve good image resolution. This implies a slow printing speed in order to achieve adequate exposure.

Fiber optic bundles are particularly appropriate for transporting slit images and facilitating the output of light onto opaque originals but conventional fibers do not correct the inherent limitations of reversed motion copying.

A principal object of this invention is to provide one-way image reversal which is appropriate to improved efficiency in photocopying.

Another object is to provide an image-reversing array of optical elements which may be used in place of or in conjunction with conventional fiber optic arrays in photocopying systems.

Still another object is to provide in photocopying systems, slit image inversion in the direction of slit travel permitting the use of unusually wide object scanning slits and high printing speeds without loss of resolution.

Other objects and advantages of the invention will become apparent from the following description.

SUMMARY OF THE INVENTION

The foregoing objects and their corollaries are accomplished by provision of an image-reversing array of thin and relatively long juxtapositioned optical elements having imaging properties in one meridian, i.e. longitudinally, and light-containment properties in the other, i.e. laterally.

In the longitudinal meridian of each of the elements of the array, there is provided a gradient refractive index which varies across the element as a parabolic function with maximum value centrally of the element. Light rays projected into one end of the element are conducted sinusoidally and converge (focus) at half-wavelength intervals along the sinusoidal path. Elements of the array are, accordingly, formed to lengths approximately equal to the half-wavelength (or some odd number of half-wavelengths) to provide a desired inversion of image-forming light directed therethrough.

In the transverse direction of individual elements of the array, each is bounded by a reflecting interface, e.g. a lower refractive index cladding glass or other coating. Image resolution in the lateral direction of the array depends on the width of individual optical elements used and resolution of image in the opposite or right-angular direction will depend upon the particular focusing properties of the elements.

The image-reversing array may be used in a photocopying application alone or in conjunction with a conventional optical fiber array which can facilitate illumination of the original to be copied and provide for control of numerical aperture.

Details of the invention will become more readily apparent from the following description when taken in conjunction with the accompanying drawings.

DESCRIPTION OF THE PREFERRED EMBODIMENT

Figure 1:
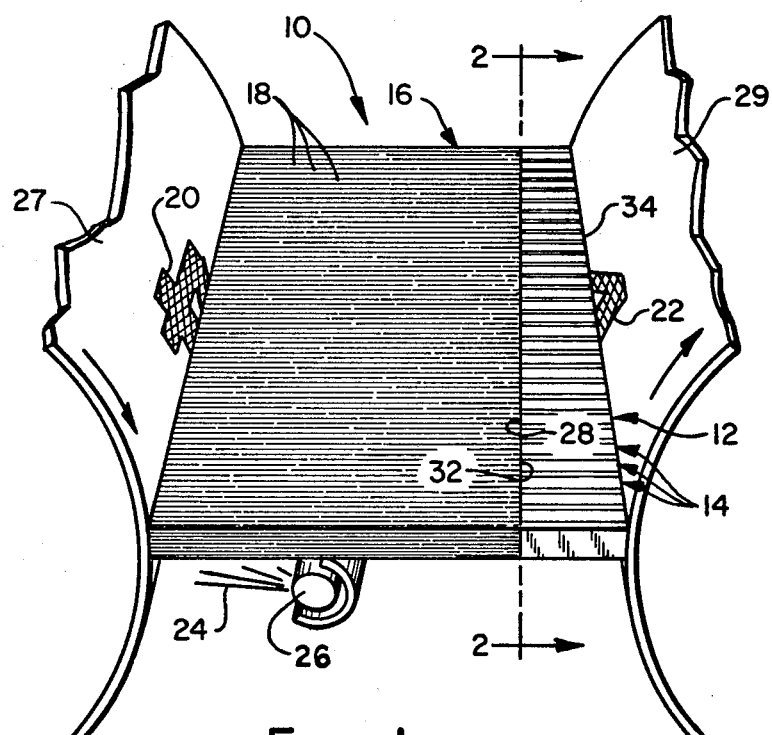
FIG. 1 is an illustration in perspective of an image copying system incorporating an image reversing embodiment of the present invention.
Figure 2:
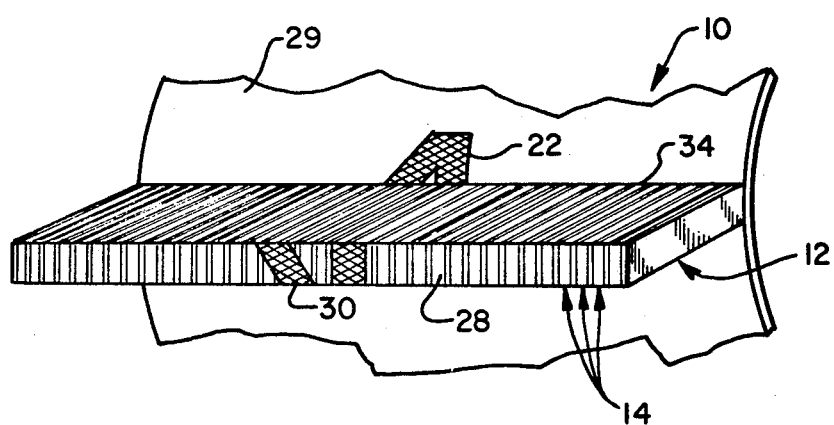
FIG. 2 is a view of the image reversing array of FIG. 1 taken along line 2—2 looking in the direction of the arrows.

Referring to the drawings, FIGS. 1 and 2 illustrate an image copying system 10 incorporating an image reversing array 12 of optical elements 14. The presently illustrated copying system 10 includes an image transporting array 16 of conventional optical fibers 18 for transporting a relatively long and narrow slit image of subject matter 20 to be copied to reversing array 12 for inversion into true reading form as copy 22. Array 16 facilitates the input of light 24 from source 26 onto original member 27 having the subject matter 20 which is to be copied upon copy member 29. It should be understood that the image receiving end 28 of reversing array 12 may be placed against subject matter 20 to eliminate fiber optic array 16.

Whether used in conjunction with or in place of array 16, reversing array 12 which provides image inversion in the direction of slit travel (i.e. perpendicularly to the thickness of array 16 or array 12) permits the use of considerably wider than usual scanning slits. Arrays 16 and 12 may be of considerable thickness within well known limits of practicability without causing adverse effect upon the resolution of copy 22. With this option to use an unusually wide image copying slit, higher than usual printing speeds may be used without encountering the heretofore problems of inadequate exposure.

Inversion of an image 30 of subject matter 20 to be copied, is illustrated in FIG. 2.

Details of elements 14 of reversing array 12 are illustrated in FIGS. 3-7. Each element 14 is of a rectangular configuration having a light-conducting core component 36, and claddings 38 along opposite sides of core 36. In meridian Y, core 36 has a gradient refractive index which varies in the Y direction as a parabolic function with maximum value located centrally, e.g. in the X-Z plane. This index profile is illustrated by line 40 in FIGS. 6 and 7. In the X direction, core 36 is bounded by reflecting interfaces provided by claddings 38 of lower refractive index than the lowest refractive index of core 36.

It is contemplated that core 36 be formed of a relatively high refractive index optical glass of the type or similar to that used in the fabrication of conventional gradient index optical fiber cores and that claddings 38 be formed of lower refractive index glass also of the same or similar to cladding glasses used in conventional optical fiber construction. Claddings 38 may, alternatively, comprise metallic coatings for containment of light in core 36 by specular reflection. The small number of reflections required to transmit light rays longitudinally through elements 14, would render light loss by absorption in metallic coatings minimal.

Figure 3:
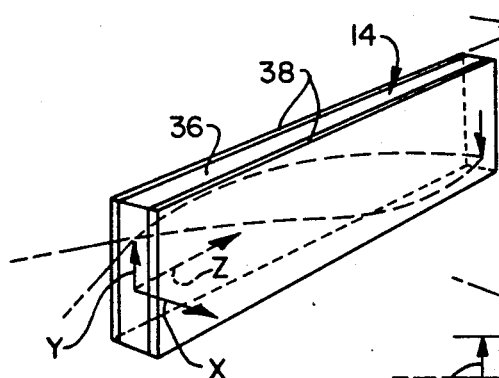
FIG. 3 is an illustration, in perspective, of one of a multiplicity of juxtapositioned image reversing elements of the array of FIGS. 1 and 2 wherein its image reversing properties are illustrated with broken lines.
Figure 4:
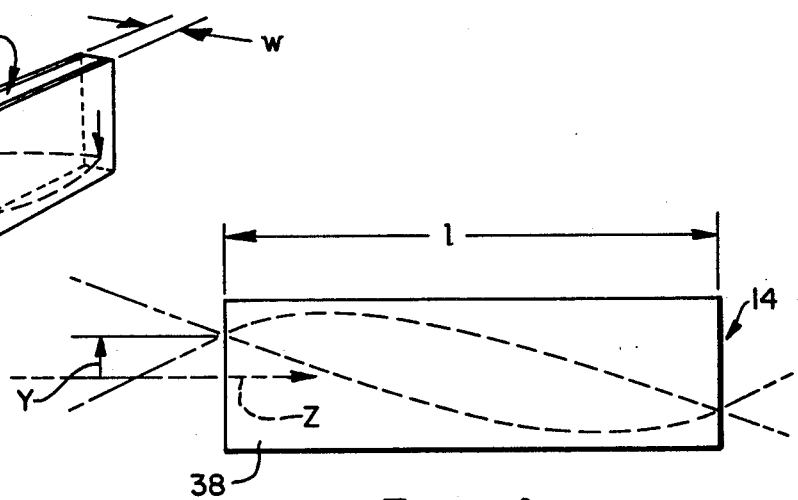
FIG. 4 is a side elevational view of the element of FIG. 3.
Figure 5:
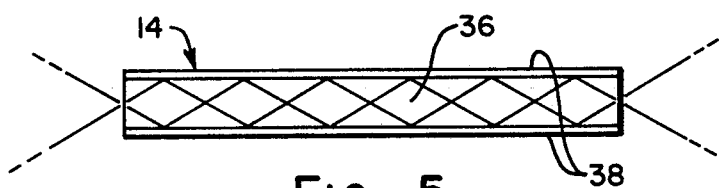
FIG. 5 is a top plan view of the element of FIG. 3.
Figure 6:
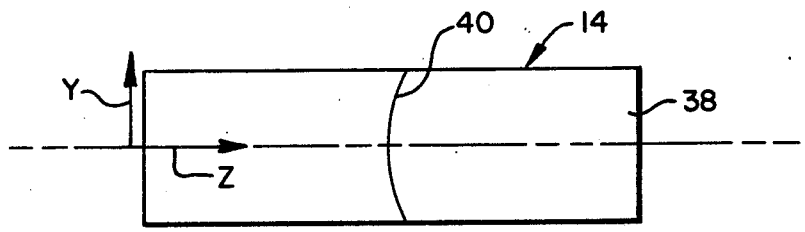
FIGS. 6 and 7 are similar side and top plan views of the same element showing its refractive index profile with full line illustration.
Figure 7:
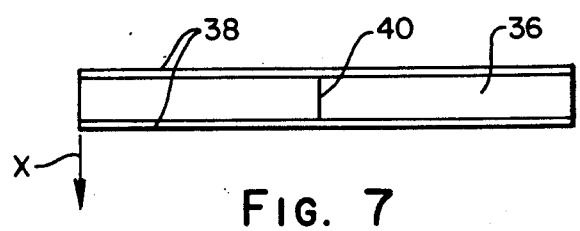

As illustrated in FIG. 5, ray paths projected on the X-Z plane resemble those encountered in a conventional optical fiber. The ray paths projected onto the Y-Z plane, however, have an approximately sinusoidal shape converging (focusing) at half-wavelength intervals along the Z axis as has been illustrated with broken lines in FIGS. 3 and 4. Lengths 1 of elements 14 are, accordingly, controlled to equal the half-wavelength, (or some odd number of half-wavelengths) to obtain the desired inversion of image in the Y direction, e.g. as illustrated in FIG. 3. Resolution of images in the Y direction will be controlled by, or depend upon, the focusing properties of elements 14 while resolution in the X direction will depend upon the width w (FIG. 3) of each element 14.

Manufacture of reversing array 12 would make use of drawing and assembly steps similar to those used in the manufacture of conventional optical fiber products, e.g. as in U.S. Pat. Nos. 2,992,517 or 3,037,241 with the gradient refractive index profile introduced by methods similar to those used for making conventional gradient index fibers. In view of the imaging requirements being relatively modest in relation to element size, the parabolic index function of profile 40 may be approximated by a series of steps using a number of glasses to provide appropriate index of refraction intervals. Such an approach is particularly appropriate for the application of convention fiber optic manufacturing tehcniques. Furthermore, a refinement of this method could make use of diffusion to blend the index step into a smooth curve. In still another refinement, the starting pieces of glass would not only have index-of-refraction values appropriate for a specific portion of the parabolic index curve 40 but also themselves incorporate the correct index gradient.

Those interested in details of techniques used to make gradient refractive index fibers may refer to U.S. Pat. Nos. 3,963,468; 4,061,484; 4,057,320; or 4,053,205.

Those skilled in the art will readily appreciate that various other modifications and adaptations of the precise form of the invention here shown may be made to suit particular requirements. It is, accordingly, intended that all modifications which incorporate the novel concept disclosed are to be construed as coming within the scope of the claims or the range of equivalency to which they are entitled.

I clam:

1. An image reversing array of elongated juxtapositioned optical elements each comprising:
   a light-conducting core component having a rectilineal cross-sectional configuration and a gradient index of refraction varying approximately as a parabolic function only in one direction across said component from one of a first pair of opposite sides thereof to the other side, the maximum value of said refractive index being approximately centrally of said component; and
   means on a second pair of opposite sides of said component for providing internally light-reflecting interfaces along said second pair of sides whereby the optical element provides imaging properties in the direction of its length and light-containment properties in directions thereacross.

2. An image reversing array according to claim 1 wherein light rays directed into said core component become transmitted therethrough along approximately sinusoidal paths in planes parallel to a said one direction along said component and converge (focus) in approximately half-wavelength intervals, said component being of a length corresponding to one half-wavelength interval.

3. An image reversing array according to claim 2 wherein said component is of a length corresponding to an odd number of said half-wavelength intervals.

4. An image reversing array according to claim 2 wherein said core component has a longer cross-sectional dimension in said one direction of variable refractive index than in a direction perpendicularly thereto.

5. An image reversing array according to claim 4 wherein said dimension perpendicularly to said longer dimension extends between said second pair of opposite sides of said core components and is controlled in size according to resolution of image properties desired of said image reversing array in one meridian, resolution of image in a second orthogonal meridian being determined by focus of light rays of said elements in said array.

6. An image reversing array according to claim 1 wherein said core component is formed of glass and said means on said second pair of opposite sides comprises glass claddings having refractive indices lower than the minimum value of refractive index of said core component.

7. An image reversing array according to claim 1 wherein said means on said second pair of opoosite sides of said core component comprises, in each case, a specularly reflecting coating.

8. In an image-copying system for transmitting optical images of subject matter from an original member to a copy member, the improvement comprising:
   an image reversing array of juxtapositioned optical elements between said members, the juxtapositioning of said elements being in a direction across said members;
   said optical elements each including a light-conducting core component having a gradient index of refraction varying as a parabolic function only in one direction across said component from one of a first pair of opposite sides thereof to the other side, the maximum value of said refractive index being approximately centrally of said component; and means on a second pair of opposite sides of said component for providing internally light-reflecting interfaces along said second pair of sides.

9. The improvement in an image-copying system according to claim 8 wherein light rays directed into said core component become transmitted therethrough along approximately sinusoidal paths in planes parallel to said one direction along said component and converged (focus) in approximately half-wavelength intervals, said component being of length corresponding to one of said half-wavelength intervals.

10. The improvement in an image-copying system according to claim 8 wherein said component is of a length corresponding to an odd number of said half-wavelength intervals.

* * * * *